R. H. WAINFORD AND C. H. DARLING.
APPARATUS FOR THE MANUFACTURE OF POTTERY WARE.
APPLICATION FILED MAY 17, 1919.

1,408,663.

Patented Mar. 7, 1922.
4 SHEETS—SHEET 1.

INVENTOR
Richard Hartney Wainford,
C. Harry Darling
BY
[signature]
ATTORNEY

R. H. WAINFORD AND C. H. DARLING.
APPARATUS FOR THE MANUFACTURE OF POTTERY WARE.
APPLICATION FILED MAY 17, 1919.

1,408,663.

Patented Mar. 7, 1922.
4 SHEETS—SHEET 2.

INVENTOR
Richard Harding Wainford,
C. Harry Darling
BY
Francis C. Lowthorp
ATTORNEY

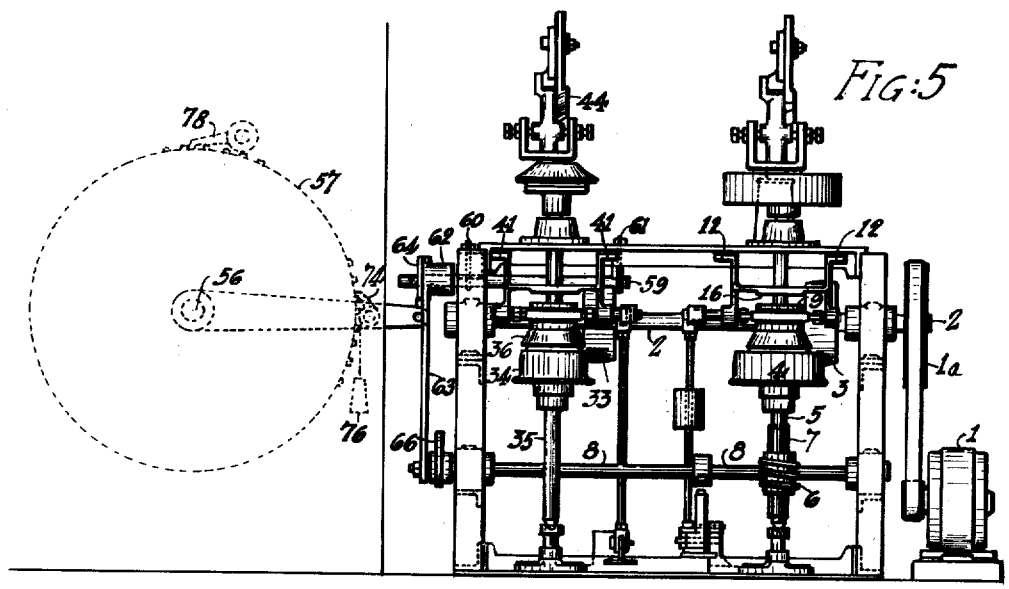
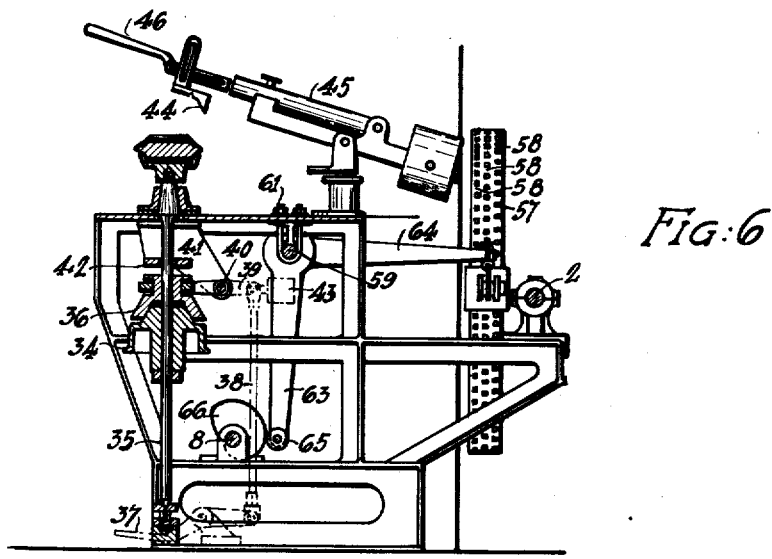

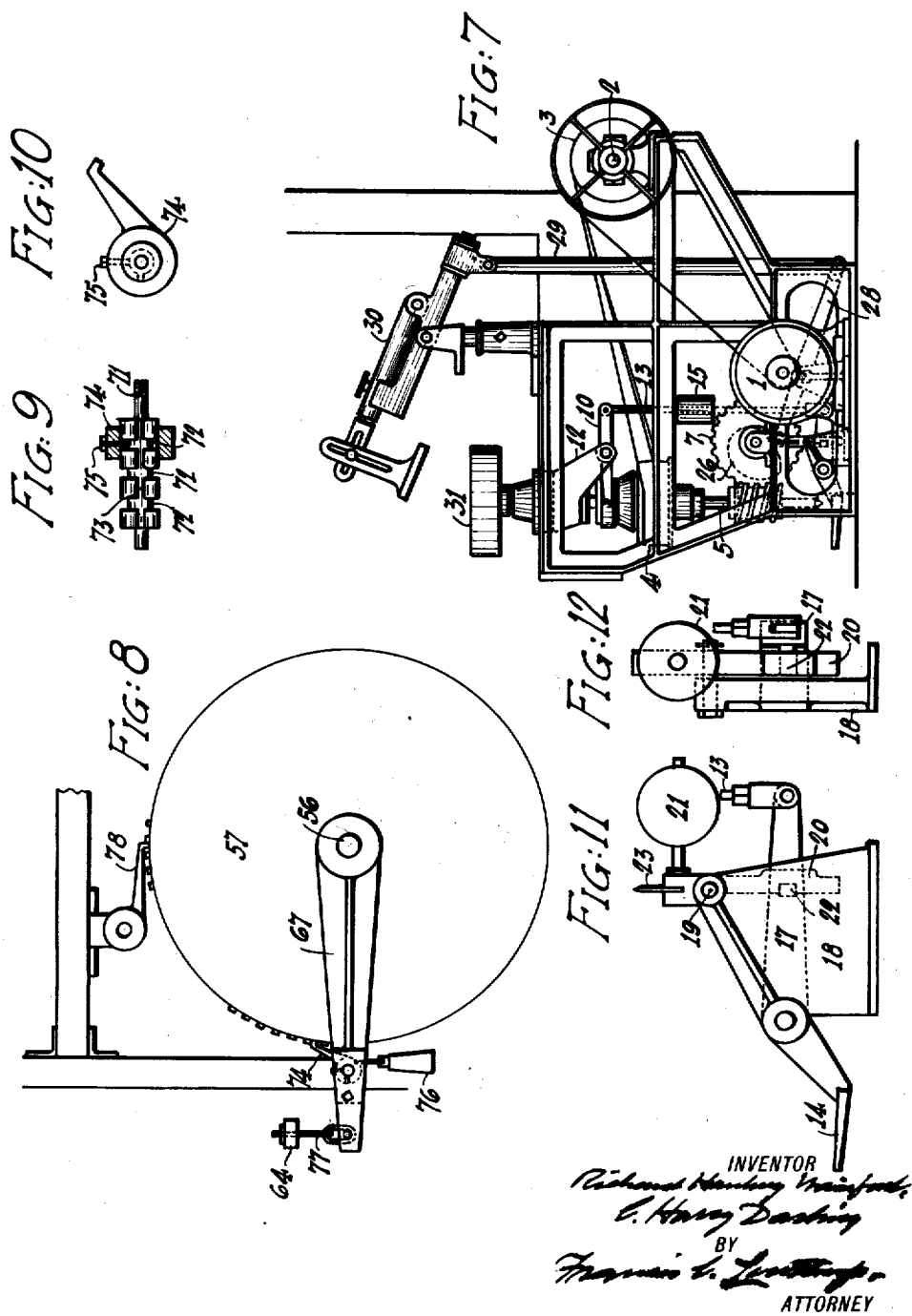

UNITED STATES PATENT OFFICE.

RICHARD HANBURY WAINFORD AND CHARLES HARRY DARLING, OF TRENTON, NEW JERSEY.

APPARATUS FOR THE MANUFACTURE OF POTTERY WARE 1,408,663.     Specification of Letters Patent.     Patented Mar. 7, 1922.

Application filed May 17, 1919. Serial No. 297,754.

*To all whom it may concern:*

Be it known that we, RICHARD HANBURY WAINFORD, a subject of the United Kingdom of Great Britain and Ireland, residing in Trenton, in the county of Mercer, in the State of New Jersey, and CHARLES HARRY DARLING, a citizen of the United States, residing at said Trenton, have jointly invented a new and useful Apparatus for the Manufacture of Pottery Ware, of which the following is a specification.

In the manufacture of table ware, such as plates, cups, saucers and similarly formed pottery ware, the clay used is first formed into slabs on what is known as a batting machine. These slabs of clay are then placed on molds and are formed thereon in a jigger and then are dried in a heated apartment or in a drying-stove, when the ware is in a condition to be removed from the molds and finished for the biscuit kiln. Heretofore these operations have required much handling of the ware and considerable labor and have occupied considerable time. When drying-stoves are used for driving the moisture from the molded ware, the ware is placed upon ware-boards within the stove through an opening in the wall of the stove; and these ware-boards are kept in constant motion within the stove until the ware is delivered by them at the other end of the stove, thoroughly dried, and is removed from the ware-boards for further treatment. As the ware-boards are in constant motion within the drying-stove, any irregularity of delivery of the moist ware into the stove results in loss of capacity of the stove, loss of time and reduction of the quantity of ware dried and delivered by the stove.

The object of our invention is to provide practical means by which a batting-machine, a jigger and a drying stove may be so combined that the movement of the ware-boards of the drying-stove shall be controlled by the operation of the batting-machine and so timed in their movement that the full capacity of the drying-stove shall be automatically utilized and certain manual labor shall be dispensed with.

Figure 1:
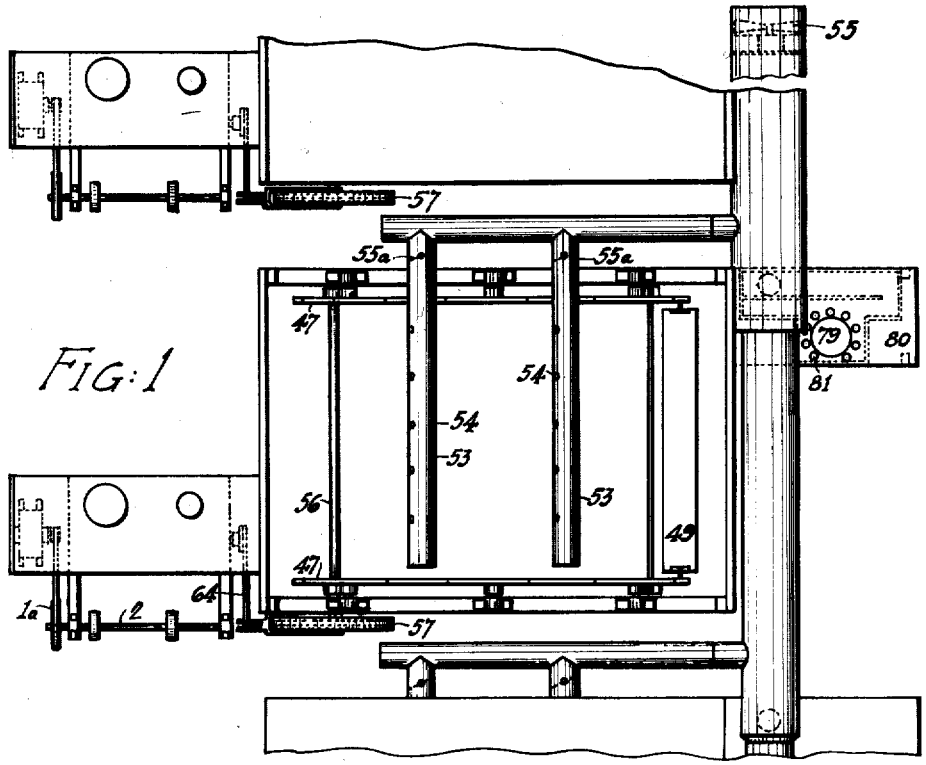
Figure 2:
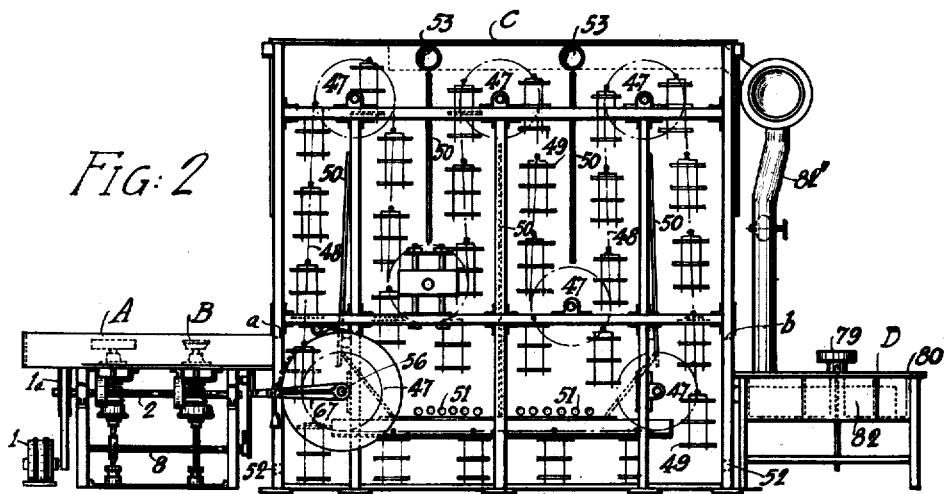
Figure 3:
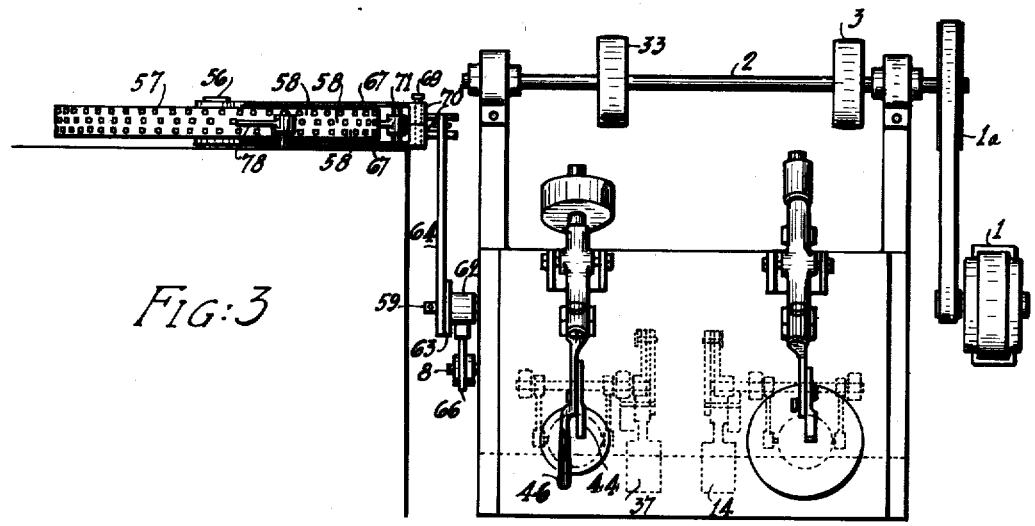
Figure 4:
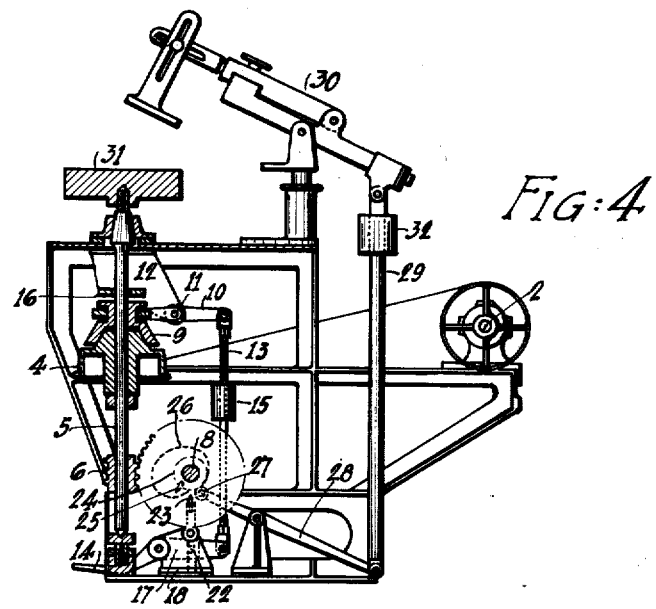

In the accompanying drawings, forming a part of this specification, we have shown a batting-machine and a jigger combined with a drying-stove generally similar to the drying-stove described and claimed in United States Letters Patent, No. 1,289,976, granted to Richard Hanbury Wainford on December 31, 1918, for drying-stove; and in said drawings Fig. 1 is a diagrammatic plan view of one complete apparatus and illustrating the assemblage of a plurality of such mechanisms, the top of the casing of the middle drying-stove being removed to disclose the means for ventilating the stove; Fig. 2 is a side elevation of the apparatus with the side casing of the drying-stove removed; Fig. 3 is a plan view of the batting-machine and jigger and the timing-wheel connecting the actuating means of the batting-machine with the means for progressing the ware-boards through the drying stove; Fig. 4 is an end elevation of the batting-machine and showing details of its clutch device; Fig. 5 is a front elevation of the batting-machine and jigger showing details of the means connecting the actuating means of the batting-machine with the actuating means of the ware-boards of the drying-stove; Fig. 6 is an end elevation of the jigger and further illustrates the timing-wheel; Fig. 7 is an end elevation of the batting-machine showing further details of construction; and Figs. 8, 9, 10, 11 and 12 illustrate details of construction to be hereinafter referred to.

In assembling the combined apparatuses, they are arranged as shown in Fig. 2, their order from left to right being the batting-machine, A, the jigger, B, the drying-stove, C, and, preferably, a cleaning apparatus, D. The drying-stove is enclosed by walls and top made of any suitable material and has two openings, one, $a$, at one end of the table of the batting-machine and jigger, and the other, $b$, at the adjacent end of the table of the cleaning device, D. Said openings may be closed by doors or shutters, if desired, and are in close proximity to the series of ware-boards which pass the same in the course of their progressive movement through the drying-stove.

The batting-machine receives its motive power from a motor, 1, belted to a pulley, $1^a$, fixed on a horizontal shaft, 2, which also carries another pulley by which the jigger is operated. The batting-machine is operated by the pulley, 3, which is belted to an idler, 4, mounted on the vertical shaft 5, on which shaft is keyed the worm 6 which meshes with the worm-gear wheel 7 rigidly mounted on the horizontal shaft 8. Slidingly mounted on the shaft 5 and splined thereon is the clutch 9, which is connected with and operable by the lever 10 mounted on the fulcrum-pin 11 supported by the brackets 12, 12. One end of said lever 10 is connected with a rod 13, which is operable by the treadle 14, and is normally held in its lower position by the weight 15 fixed thereon. The clutch 9 is, by said means, held normally out of contact with the idler 4. Supported by the brackets 12, 12 is a plate 16, through which the shaft 5 passes, and the upper face of the clutch 9 is adapted to contact with the lower face of said plate, thus inducing a braking-action to stop the rotation of the shaft 5 promptly when the clutch contacts with the plate. The under face of the plate is preferably provided with a leather or other covering to expedite the braking-action and to cushion the parts when contacting. The lower end of the rod 13 through which the clutch 9 is operated is attached to one arm of the treadle-lever 17 (see Figs. 11 and 12), which lever is fulcrumed on the bracket 18. Said bracket 18 bears a pintle 19 on which is swung a latch 20, to the upper end of which is fixed the weight 21. The latch 20 is notched on one side to receive a lug 22 which is formed on and which extends laterally from the lever 17, and at the upper end of the latch 20 is fixed the upwardly-extending finger 23. On the shaft 8, bearing the worm-wheel 7, (see Fig. 4) is fixed a collar 24 bearing a finger 25 which rotates with said shaft 8 in a plane in which lies the finger 23 of the latch 20, so that the fingers 23 and 25 will contact with each other on each complete revolution of the shaft 8.

On shaft 8 is fixed the cam 26 which is in constant contact with a friction roller 27 mounted on one end of the lever 28 (see Fig. 4). A rod 29 connects the other end of the lever 28 with one end of the arm 30, which arm carries adjustably fixed to its other end the batting tool to co-act with the rotatable head 31 fixed on the top of the vertical shaft 5.

The jigger (see Figs. 5 and 6) is operated independently of the batting machine by another pulley 33 on the drive-shaft 2 (see Fig. 3), which pulley is belted to an idler 34 on the vertical shaft 35. A clutch and brake 36, similar to the clutch and brake of the batting-machine, is mounted on said shaft 35. Said clutch and brake is operated, regulated and controlled by the treadle 37 through the treadle-lever, the rod 38 and lever 39 fulcrumed on a pin 40 fixed on a bracket 41. The braking-face of the clutch is normally held in contact with the lower face of the plate 42 by the counterweight 43 on the end of the lever 39. The molding or jigger tool 44 is adjustably fixed upon the counterweighted pull-down 45 which is operated by the handle 46.

The drying-stove, which is more particularly described in United States Letters Patent No. 1,289,976, hereinabove mentioned, is provided with a casing which encloses series of sprocket wheels 47 located on both sides of the stove at the top and near the bottom thereof, upon which are carried endless sprocket-chains 48, and on which chains are suspended a series of multiple ware-boards 49 extending transversely of the stove. The body of the stove is divided into several compartments by partitions 50 so placed that the ware-boards in their progress through the stove will clear them at their upper and lower ends and pass without hindrance from compartment to compartment. The interior of the stove is heated by steam passing through pipes 51 extending transversely of the stove, fresh air being admitted to the interior of the stove through openings 52 in its walls. At the top of the stove are placed the transverse ventilating pipes 53 having openings 54 in their walls (see Figs 1 and 2) through which the moisture laden air within the stove is drawn off by the aid of a fan 55 (see Fig. 1) and discharged outside the building in which the stove is located. The extent of draft caused by said fan in the ventilating pipes may be regulated by the dampers 55ª.

The means for progressing the ware-boards through the several compartments of the stove are driven by the transverse shaft 56 which carries at or near each of its ends a sprocket-wheel 47, said wheels serving to drive the sprocket-chains 48 passing over the other sprocket-wheels of the stove.

The means for operating the drive-shaft 56 are shown in Figs. 3, 5, 6, 8, 9 and 10 of the drawings. One end of the drive-shaft 56 extends outwardly through the side-wall of the stove and has keyed upon it the disc or wheel 57. The periphery of said wheel 57 has formed in it several series of recesses. The recesses of each series are spaced equally apart throughout said series and extend entirely around the circumference of the wheel, but the spacing between the recesses of any one of the series differs from the spacing between the recesses of each of the other series. Fixed to the underside of the top of the frame supporting the jigger and the batting-machine is the pin 59 which is held to said frame by the U-bolts 60, 61. Swivelled on the outer end of the pin 59 is the boss 62 formed integral with the lever-arm 63. Also swivelled on said pin 59 and bolted to said lever-arm 63 is the lever-arm 64, substantially at right-angles with said lever-arm 63. The lever-arm 63 carries at its lower end a friction roller 65, which contacts with a cam 66 fixed upon the shaft 8. Embracing the recessed wheel 57 and loose upon the drive-shaft 56, are two arms 67. (See Figs. 3 and 8.) These arms are joined together at their outer ends by a bolt 69 passed through inwardly projecting bosses 70 formed on said arms. (See Fig. 3.) Between and in said arms is rigidly fixed the pin 71 (see Figs. 3 and 9) which is circumferentially grooved at 72, 72, 72, and is provided with the longitudinal groove 73. Mounted on said pin 71 is the driving-pawl 74 (see Figs. 8, 9 and 10) having a bore in its boss of a diameter sufficient to permit it to embrace any part of the pin 71. A pilot-screw 75 is inserted through the boss of the pawl far enough to project inwardly in the grooves 72 and 73. By this construction the pawl 74 may be turned upon the pin 71 until the projecting end of the pilot-screw is brought into line with the longitudinal groove 73 and can be moved from one of the grooves 72 into any other of said circumferential grooves to hold the pawl in line therewith until changed at the will of the operator. Thus the lip of the pawl may be brought into operative connection with the recesses 58 of any one of the series thereof encircling the periphery of the wheel 57, in one or another of which recesses said lip is normally held by the action of the weight 76. (See Fig. 8.) On the outer end of the lever-arm 64, mounted on the pin 59, is the shackle 77 connecting said arm 64 with the arms 67 (see Figs. 3 and 8,) and at each upward movement of said arm 64 the arms 67 are drawn slightly upward and the pawl 74 turns the wheel 57 a small part of a revolution, thus also turning the drive-shaft 56 slightly and causing the sprocket-chains of the stove to force a slight progression of all of the ware-boards within the stove. All reverse action of the apparatus is prevented by the check-pawl 78 (see Fig. 8,) the lip of which normally gravitates into one of the recesses of the same series in which the pawl 74 is operating, means for shifting said pawl 78 into the different planes of the series of recesses, similar to the means used for shifting the pawl 74, being provided.

In Figs. 1 and 2 of the drawings we have shown assembled with the batting-machine, jigger and drying stove, a cleaning apparatus whereon the dried ware delivered from the stove is cleaned.

This cleaning apparatus consists of a simple hand-turned wheel or head, 79, mounted upon a table 80. In the top of the table are formed openings, 81, around the head 79. Under the table is a tank, 82, for water, into which the heavier particles of clay stripped from the ware being cleaned may fall, while the dust generated by the work is drawn through said openings 81 and into and through the ventilating pipe 82 by the action of the fan 55 and is finally discharged by said fan without the building.

The operation of the combined apparatuses thus described is as follows:—The jiggerman deposits a lump of tempered clay upon the rotative head of the batting-machine and depresses the treadle of the machine with his foot. Such action forces the clutch of the machine into contact with the idler pulley on the shaft 5, supporting the head, and rotates said shaft and head. The operator's foot is then immediately removed from the treadle, which is held in its depressed position by the engagement of the stud 22 with the notch in the latch 20 until the finger 25 makes a complete revolution with the shaft 8 and contacts with the finger 23 and releases the latch from the stud. Upon such release of the latch the weight 15 depresses the rod 13, throwing the clutch 9 out of contact with its actuating pulley and into frictional contact with the plate 12, thus stopping the rotation of shaft 5 and of shaft 8, connected with shaft 5 by the worm-gear, and throwing the treadle again into operative position. While the shaft 8 has been making its single revolution it has, through the means of the cam thereon and the angle-lever and the pawl described, forced the recessed wheel 57 to turn a small part of a revolution and moved the wareboards of the drying-stove a short distance upward by the opening $a$ in the stove-casing and downward by the opening $b$ in the other end thereof; and in such new positions said ware-boards remain until the batting-machine is again set in motion by depressing its treadle. The jiggerman having taken an empty mold from the ware-board within the stove at the opening $a$ and placed it upon the jiggerhead B, takes from the batting-machine-head A, the finished bat with one hand, while with his other hand he places another ball of clay upon the said batting-head. He then places the finished bat upon the mold on the jigger-head, depresses the treadle 14 to start the batting machine in motion, depresses the treadle of the jigger and manipulates the pull-down to form the bat on the jigger-head into the intended form. This done, he releases the treadle and clutch of the jigger, bringing the jigger-head to rest, and removes the mold with the formed piece of ware thereon, and places it upon the ware-board within the stove at the opening $a$, and takes from the said ware-board another empty mold, and places it upon the jigger-head to repeat said operation. In the mean time the batting machine is in operation forming another bat, and automatically comes to a full stop, enabling the operator to remove the newly made bat from the batting-head to the mold on the jigger-head and proceed with his work as described. These operations of the batting machine and the jigger are continued until enough pieces of molded ware on their molds are placed upon the ware-board to fill it, by which time the ware-boards will have progressed through the stove sufficiently to bring the next succeeding ware-board of the series opposite the opening $a$; and the operation of filling that board with molded ware is proceeded with in the same manner. By the time the ware reaches the opening $b$ at the other end of the stove it is thoroughly dried and is removed through said opening by the finisher and finished in the usual manner; and is ready for the biscuit kiln.

As will be understood, the rate of speed at which the ware-boards are progressed through the stove and past the openings $a$ and $b$ is determined by the speed with which the jiggerman works and the sizes of the molds in use. The jiggerman may be molding various sizes of ware in the daily work, at one time of such size that only five pieces could be placed upon a ware-board, while at other times six or seven pieces might be required to fill the board. At each change in the size of the molds the jiggerman changes the positions of the driving pawl and the check pawl co-acting with the recesses in the periphery of the wheel 57 so as to bring them into line with that series of recesses which are so spaced apart as to time the progression of the ware-boards to the operations of the jigger and afford sufficient time for filling each ware-board with ware of the size next to be molded without delaying its progress beyond the time requisite for such purpose. Our invention thus secures the full utilization of the capacity of the drying stove, increases the output, and dispenses with the work of two operatives, a batter-out and a runner, both of whom are necessarily employed when our invention is not used.

It will be noted that the means devised for braking the batting machine and jigger are such as to prevent any upward or lateral thrusts upon the vertical driving shafts of those machines when the brakes are applied, the clutches with their braking faces being arranged to slide upon the shafts and to contact with plates fixed to the frames of the machines and entirely free of the shafts, whereby wear of bearings and waste of power are obviated.

We have illustrated our invention with the combined machines so arranged that the operation of the ware-boards of the drying stove is controlled by the operation of the batting machine; but while we consider this the most efficient and satisfactory arrangement of the machines, the movements of the ware-boards may readily be controlled by the operation of the jigger by slight modifications of the means shown and described, while, if preferred, either the batting machine or the jigger may be omitted from the combination and the machine retained arranged to progress the ware-boards through the stove synchronously with the operation of the machine. We have, therefore, in some of our claims, used the term "machine for forming clay" to indicate either a batting machine or a jigger.

Having thus described our invention, we claim:—

1. In apparatus of the class described, the combination of a machine for forming clay and a drying stove having a series of movable ware-boards, means intermediate said machine and said drying stove whereby the movement of said ware-boards is synchronized with the operation of said machine, and means for automatically stopping the operation of said machine at a predetermined stage of its operation.

2. In apparatus of the class described, the combination of a machine for forming clay and a drying stove, means intermediate said machine and said drying stove whereby the ware-boards of said stove are progressed through said stove synchronously with the operation of said machine, and means for varying the rate of movement of said ware-boards relatively to the speed of operation of said machine.

3. In apparatus of the class described, the combination of a machine for forming clay and a drying stove having a plurality of compartments and a series of movable ware-boards, means for progressing said ware-boards through the compartments of said stove, means intermediate said machine and said stove whereby the movements of said ware-boards is synchronized with and controlled by the operation of said machine, and means for automatically stopping the operation of said machine at a predetermined stage of its operation.

4. In apparatus of the class described, the combination of a machine for forming clay and a drying stove having a series of movable ware-boards, means intermediate said machine and said stove whereby the movement of said ware-boards is synchronized with and controlled by the operation of said machine, said means comprising a shaft, rotatable by the driving shaft of said machine, and having a cam, a lever contacting with said cam, a wheel connected with the driving shaft of said stove, and means on said lever adapted to contact with and rotate said wheel.

5. In apparatus of the class described, the combination of a machine for forming clay and a drying stove having a series of movable ware-boards, means intermediate said stove and said machine whereby the movement of said ware-boards is synchronized with and controlled by the operation of said machine, said means comprising a shaft, rotatable by the driving shaft of said machine, and having a cam, a lever contacting with said cam, a wheel connected with the driving member of said stove, means on said lever adapted to contact with and rotate said wheel, and means for stopping the rotation of the driving shaft of said machine automatically upon each full rotation of said cam-shaft.

6. In apparatus of the class described, the combination of a machine for forming clay and a drying stove having a series of movable ware-boards, means intermediate said stove and said machine, whereby the movement of said ware-boards is synchronized with and controlled by the operation of said machine, said means comprising a shaft rotatable by the driving shaft of said machine, and having a cam, a lever contacting with said cam, a wheel connected with the driving member of said stove and having a plurality of peripheral series of recesses, the recesses of each series being spaced apart differently from the recesses of the other series, a ratchet carried by said lever adapted to enter said recesses and force said wheel in a partial revolution and to be retracted from the recesses by the reverse movement of said lever, and means for shifting said ratchet into alignment with any of said series of recesses at will.

RICHARD HANBURY WAINFORD.
C. HARRY DARLING.

Witnesses:
V. B. LOWTHORP,
JOHN R. D. BOWER.